United States Patent [19]

Resnikoff

[11] Patent Number: 5,073,964
[45] Date of Patent: Dec. 17, 1991

[54] SIGNAL PROCESSING DEVICE AND METHOD

[75] Inventor: Howard Resnikoff, Cambridge, Mass.

[73] Assignee: Aware, Inc., Cambridge, Mass.

[21] Appl. No.: 389,592

[22] Filed: Aug. 4, 1989

[51] Int. Cl.$^5$ .............................................. G06K 9/36
[52] U.S. Cl. ....................................... 382/41; 382/43
[58] Field of Search ..................................... 382/41, 43

[56] References Cited

U.S. PATENT DOCUMENTS

| | | | |
|---|---|---|---|
| 4,242,733 | 12/1980 | Deal | 364/515 |
| 4,242,734 | 12/1980 | Deal | 364/515 |
| 4,484,346 | 11/1984 | Sternberg et al. | 382/27 |
| 4,574,311 | 3/1986 | Resnikoff et al. | 358/213 |
| 4,811,413 | 3/1989 | Kimmel | 382/41 |
| 4,901,360 | 2/1990 | Shu et al. | 382/41 |

FOREIGN PATENT DOCUMENTS 0253608 1/1988 European Pat. Off. .

OTHER PUBLICATIONS

*Signal Processing IV: Theories and Applications;* Sep. 5–8, 88, J. A. Mitchell et al., pp. 315–318, "Single-Chip-Based Recursive Structure for Real Time Image Transform".

*Primary Examiner*—Leo H. Boudreau
*Assistant Examiner*—Andrew W. Johns
*Attorney, Agent, or Firm*—Spencer & Frank

[57] ABSTRACT

A signal processing device for generating an output signal corresponding to a multi-dimensional input signal such as a two-dimensional image and a method of processing such a signal. The device includes an array of processing elements which are congruent and shaped so that they can be arranged on a processing element so that adjacent pairs of elements considered as a unit are geometrically similar to each processing element. Output signals of individual processing units are linearly ordered in such a manner as to maintain adjacency of signals from adjacent processing elements in the array. The ordering facilitates one-dimensional Haar transform processing of the signals in such a manner as to localize signal energy.

21 Claims, 11 Drawing Sheets

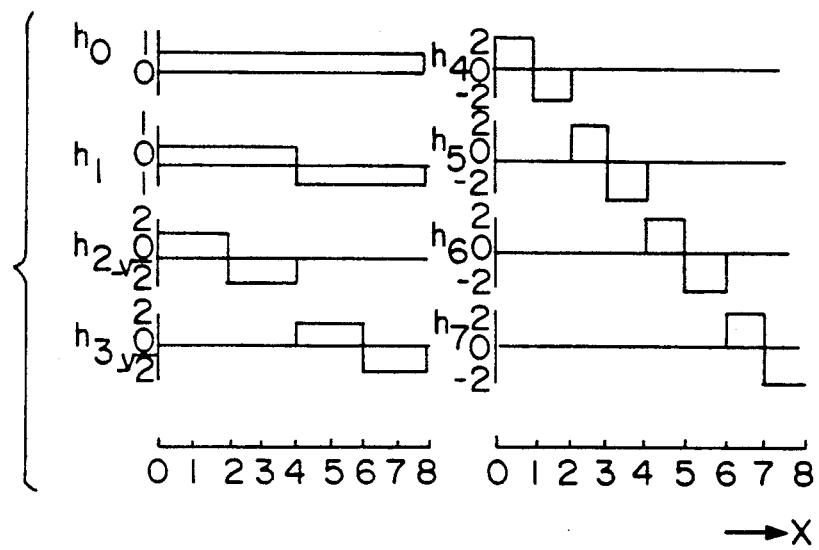
FIG. IA
PRIOR ART
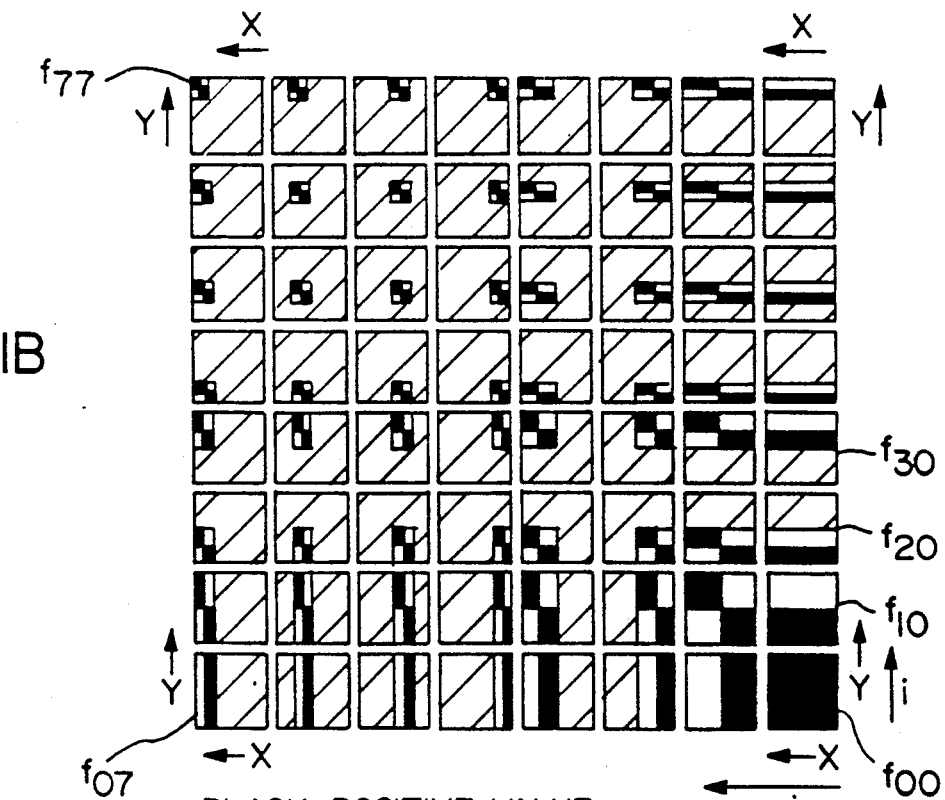
FIG. IB
PRIOR ART
BLACK = POSITIVE VALUE
WHITE = NEGATIVE VALUE
CROSS HATCH = 0

SIGNAL PROCESSING DEVICE AND METHOD

BACKGROUND OF THE INVENTION

1. Field of the Invention

The invention relates to sensing and display devices and, in particular, to devices which locate and sense or display multi-dimensional signal energy at different detected levels of refinement.

2. Description of the Prior Art

Display devices such as video monitors or LCD arrays process electrical input signals which then modulate a source of visible light for display. Similarly, video cameras receive modulated visible light signals which are converted to electrical signals for transmission or storage. They are special cases of sensor type and display type transducers and associated electronics which accept an input signal and convert it to an appropriate form for further processing.

Multi-dimensional signal energy which is typically directly received by such sensors to be displayed by such displays, is distributed both in spatial location and in spatial frequency. Conventional systems for processing such multi-dimensional signals typically apply transforms of the mathematical space of multi-dimensional signals in order to isolate and measure spatial and frequency characteristics of the signal. For example, considering two-dimensional signals received by a video camera to be analyzed as to content, i.e. subjected to pattern recognition, a transform of the signal can produce information as to the existence and location of sharp edges, which may help identify the outline of an object being sought.

Multi-dimensional signals are typically represented by a multi-dimensional array of data. For a two-dimensional array, which may represent an image, a transform of the array is normally a two-dimensional transform which is computed as a sequence of two one-dimensional transforms applied to the rows and columns of the two dimensional array of data. The basis functions for a two-dimensional transform, that is, the orthogonal set of functions which when multiplied by the respective transform coefficients and summed produce the original two-dimensional signal, are known to be "product transforms" calculated as the products of the basis functions for the corresponding one-dimensional transforms.

The use of such two-dimensional transforms in the context of pattern recognition has two disadvantages. Firstly, the number of calculational steps is high and therefore the time required long. Secondly, the basis functions do not "localize" signal energy, that is, associate a particular spatial frequency signal with a particular area of the array, and as a result, the transform must be calculated over the entire array in order to determine locations of concentrations of signal energy of a particular spatial frequency. These disadvantages are further explained below.

The time to compute a one-dimensional transform of a linear array is proportional to the number of calculations, and for a linear array of n signal values may be represented by $T(n)$ and a one-dimensional transform of $n^2$ signal values represented by $T(n^2)$. On the other hand, the time required to compute the two-dimensional transform of $n^2$ signal values in a square nxn array as a product of one-dimensional transforms would be at least $2nT(n)$ since there are n rows of data each of which requires a computational time of $T(n)$ and n columns each of which also requires a computational time of $T(n)$. Thus, where $2nT(n) > T(n^2)$, more time is required to perform a transform for an nxn array of data as a sequence of two one-dimensional transforms than to perform the same transform as a one dimensional transform of the same data reordered in a linear array.

For example, for the serial Fast Fourier Transform, $T(n)$ in known to be proportional to nlogn so that $T(n^2)$ is proportional to $n^2 \log n^2 = 2n(n\log n)$ and thus $T(n^2) = 2n(T(n))$ and therefore the use of a sequence of one-dimensional transforms to compute the transform of an nxn array should take no more time than reordering the array into a single linear array and performing a single one-dimensional transform. However for other transforms, and when transforms are computed in parallel, the disadvantages of computing a two-dimensional transform as a sequence of one-dimensional transforms can be very substantial. For example, parallel implementations of both the Fast Fourier Transform and the Haar transform require time $T(n)$ proportional to log n to compute the transform of n signal values, from which it follows that $T(n^2) = 2c\log n$ whereas $2n(T(n)) = 2cn\log n$, for some constant c. This shows that the ratio of time required to compute the transform of a two-dimensional signal array as a sequence of one-dimensional transforms to the time required to compute the transform by reordering the single values into a single linear array and performing a single one-dimensional transform, is proportional to n. The prior transforms of multi-dimensional signals such as two-dimensional images have been performed only by first computing a sequence of one-dimensional transforms.

As to the second disadvantage of computing multi-dimensional transforms by first calculating a sequence of one-dimensional transforms, the basis functions of most conventional one-dimensional transforms do not "localize" signal energy (associate a particular spatial frequency signal with a particular area of an array). For such transforms, which include the Fourier transform, the Sine transform, the Cosine transform, the Slant transform, the Hadamard transform, and the Walsh transform, signal energy is localized by calculating appropriate linear combinations of the transform basis functions. The failure of the individual basis functions of these transforms to localize signal energy is apparent from the fact that they have values that are different from zero in a neighborhood of each value of the independent variable, e.g. the spatial position variable x or y. For example, the basis functions of the Fourier transform, Sin(mKwx) and Cos(mKwx), where m=0,1,2, . . ., w is the angular frequency variable, and K=constant, are not zero in the neighborhood of each value of x, and therefore do not localize signal energy.

There are one-dimensional transforms, such as the Haar transform and its generalizations, whose basis functions do localize signal energy. The Haar transform is generally well known and is described for example in IEEE Trans. Electromagn. Compat EMC-15:75-80 (1973); *Digital Image Processing*, William K. Pratt, pages 254–256, John Wiley & Sons (1978); and *Use of the Haar Transform and Some of its Properties in Character Recognition*, Proc, 3rd Int'l. Conf. of Pattern Recognition, Pages 844–848, IEEE, New York, 1976.

The linear Haar transform of a mathematical function defined in a unit interval on a line is derived from the Haar matrix $[h_{rs}]$, which is a $2^P \times 2^P$ matrix (P a positive integer) and whose elements $h_{rs}$ are given by the formula:

$$h_{0s} = 1$$

for s contained in [0,1,2,...... $2^P - 1$]; and $$h_{rs} = 2^{m/2} \text{ for } 2u/2^{m+1} \leq s/2^P < (2u+1)/2^{m+1}$$

$$h_{rs} = -2^{m/2} \text{ for }$$
$$(2u+1)/2^{m+1} \leq s/2^P < (2u+2)/2^{m+1} \quad (1)$$

$$h_{rs} = 0 \text{ elsewhere}$$

for s contained in [0,1,2,...... $2^P-1$], r contained in [1,2,...... $2^P-1$], and where m is the greatest integer such that $2^m$ is less than or equal to r and where $u = r - 2^m$.

For example, for P=3 and for r=3, the greatest integer m such that $2^m$ is less than r is m=1 and therefore $u = r - 2^m = 3 - 2 = 1$. Then substituting these values of m, u and r in formula (1) gives $$h_{3s} = 2^{\frac{1}{2}} \text{ for } \frac{1}{4} \leq s/8 < \frac{3}{8}$$

$$h_{3s} = -2^{\frac{1}{2}} \text{ for } \frac{3}{8} \leq s/8 < \frac{1}{2}$$

$$h_{3s} = 0 \text{ elsewhere}$$

The respective Haar basis functions are the continuous linear representations of the Haar elements $h_{rs}$ as s varies from 0 to $2^P - 1$. That is $$h_r(x) = h_{rs} (s < x < s+1; \text{ all s contained in } [0,1,2,...... 2^P-1]). \quad (1a)$$

These functions are illustrated in FIG. 1A for P=3. As can be seen from FIG. 1A and equation (1a), for the above example, $h_3(x)$ is equal to $2^{\frac{1}{2}}$ for $4 \leq x < 6$, $-2^{\frac{1}{2}}$ for $6 \leq x < 8$ and zero elsewhere. Therefore $h_{3s}$ is equal to 0 for s=0, 1, 2 and 3, is equal to $2^{\frac{1}{2}}$ for s=4 and 5, is equal to $-2^{\frac{1}{2}}$ for s=6 and 7. Then the Haar function $h_3(x)$ is equal to $h_{3s}(s \leq x < s+1$; all s contained in [0,1,2,...... $2^P-1$]).

Thus, FIG. 1A illustrates that the signal energy located along a line is represented by the coefficient of a single basis function corresponding to a segment of the line of appropriate size to accommodate the spatial frequency thereof and located at the appropriate spatial location.

However, multi-dimensional transforms which are computed as a sequence of one-dimensional transforms do not have this property. Thus, for example, even the basis functions of the two-dimensional Haar transform computed as a sequence of one-dimensional Haar transforms does not localize signal energy. This is because such transforms are product transforms in which the basis functions are products of one-dimensional basis functions. Even if the one-dimensional basis functions do localize energy, as in the case of the Haar basis functions, such localization is on many scales of localization. This means that high spatial frequency energy is localized on relatively small areas of an array while low spatial frequency energy is localized on relatively large areas of the array (that is, the scale of localization is inversely proportional to the spatial frequency). Therefore, the product basis functions are products ranging over all combinations of scales of localization of the one-dimensional basis functions and the transform coefficients thereof cannot individually define the degree of signal energy of a particular spatial frequency in a particular localized area of the signal array. As a consequence, the use of product transforms for the analysis of multi-dimensional signals does not provide an efficient means for isolating and measuring the energy of a signal by spatial frequency and location.

The product basis functions $f_{ij}(x,y) = h_i(x)h_j(y)$, $i,j=0,1...2^P-1$, where $h_i(x)$ are the one-dimensional Haar transform basis functions defined above in formulae (1) and (1a) and $h_j(y)$ are the same functions with a different independent variable y for the two-dimensional Haar Transform, exhibit this characteristic and are illustrated for an 8×8 matrix (P=3 in the above formula (1)) in FIG. 1B. In FIG. 1B, the areas which are black and white are those where signal energy represented by the corresponding Haar coefficients is located, and as can be seen, energy at a location and of any particular scale of localization may be represented by the coefficients of more than one basis function. For example, energy localized in the bottom half of the matrix and of a scale equal to one half of the matrix may be represented in the coefficients of basis functions $f_{20}$, $f_{21}$, $f_{02}$, $f_{12}$, $f_{03}$ and $f_{13}$.

SUMMARY OF THE INVENTION

It is therefore an object of the invention to provide a signal processing device and method in accordance with which multi-dimensional signals are linearly reordered (relabeled) and then processed as by a one-dimensional transform.

It is known to represent a multi-dimensional array by a labelled one-dimensional array with the signal values in each array in a one-to-one correspondence. For example, the signal data provided by a two-dimensional matrix can be arranged by columns, and within the columns by rows, to obtain a linear one-dimensional representation of the two-dimensional signal. However, arbitrary relabeling may make signals in the multi-dimensional array at locations that are distant from one another appear at close together points in the reordered or relabeled one-dimensional representation and ma separate signals at near or adjacent locations of the multi-dimensional array in the reordered or relabeled one-dimensional representation, thereby disrupting the natural coherence and relationships of signals, such as images, that represent physical processes or other orderly phenomena. Moreover, such disruptions are undesirable because they are incompatible with the concept of spatial localization of signal energy that is typically a main objective of an analysis process, as for example where an image is to be located in a plane, identified, separated from background signals and transmitted.

It is therefore another object of the invention to provide a signal processing device and method in accordance with which for each scale of localization the multi-dimensional signals are linearly reordered (relabeled) in such a way that nearby signals in the one-dimensional representation correspond to nearby signals in the multi-dimensional array and nearby signals in the multi-dimensional array correspond to nearby signals in the one-dimensional representation.

In the case of two-dimensional arrays, two-dimensional arrays of transducing members such as sensor and display elements are conventionally rectangular and the shape of each element square, rectangular or circular. Such arrays have an aliasing problem whereby fine features are distorted to a varying degree depending on their orientation relative to the orientation of the array. For example, lines on a CRT screen skewed slightly to the scan direction are distorted while lines alone or perpendicular to the scan direction are not. This aliasing problem arises to a large extent due to the regularity of the array, the simplicity of the array elements and the alignment of the edges of elements in the array, resulting in a distinct directionality in the sensitivity of sensor elements and display of display elements (pixels in the case of a CRT screen).

It is therefore another object of the invention to provide a signal processing device and method in accordance with which for each scale of localization the shapes of individual sensors and aggregates of sensors are so shaped that aliasing is reduced.

In accordance with the signal processing device of the invention, $2^N$ processing elements (such as sensor or display elements) are arrayed and so shaped to reduce aliasing on all scales of localization and so as to facilitate a linear ordering of signals received and transmitted by the respective elements so that at every scale closeness of the signals in the array is retained in the one-dimensional representation and vice versa, and a useful one-dimensional transform may be performed on the linearly ordered signals.

For purposes of identification each of these processing elements may be designated an "Nth-order processing element". These elements are all substantially identical in shape and size, substantially share common boundaries and each may be paired with another adjacent element to define an (N−1)th-order processing element. In accordance with the invention, the (N−1)th-order processing elements have substantially identical shapes and sizes to each other and are of substantially the same shape as the Nth-order processing elements. Similarly, each processing (N−1)th-order processing element may be paired with another adjacent such element to define an (N−2)th-order processing element, and in accordance with the invention, the (N−2)th-order processing elements all have substantially identical shapes and sizes to each other and are of substantially the same shape as the Nth-order processing elements. These pairings and similarities are applicable to larger and larger aggregates of the Nth-order processing elements up to and including the entire array which defines a single zero-order processing element which has substantially the same shape as each of the Nth-order processing elements. This arrangement facilitates a linear ordering of the Nth-order processing elements by labelling all Nth-order processing elements such that once labelling has begun in any particular (N−k)th-order processing element (all positive integer values of k up to N) such labelling is completed. It is to be noted that the larger the order of the processing element the lesser the degree of localization of the signal which it as a whole senses or displays. Such a labelling procedure assures that no matter what the order of processing element if two such processing elements are of the same order, adjacent and part of a same lower order element, they will be adjacent in the linear ordering.

Also, by providing that the elements all have the same shape and that elements of the same order have the same size and are therefore congruent, it is substantially assured that similarly shaped signals are similarly sensed or displayed or otherwise treated (except for position) independently anywhere on the array. Thus, in accordance with the device of the invention there is provided an array of $2^N$ successively adjacent non-overlapping Nth-order processing elements capable of receiving and transmitting signal energy, N being a positive integer.

The Nth-order processing elements have substantially congruent geometric shapes and are aggregatable into one of $2^{N-k}$ (N−k)th-order non-overlapping aggregates of $2^k$ successively adjacent Nth-order processing elements, for each value of k, all positive integers k up to and including N. Each such (N−k)th-order aggregate consists of two adjacent (N−k+1)th-order aggregates for each value of k, all integers k up to and including N. The Nth-order processing elements of each (N−k)th-order aggregate together form a substantially continuous body and define an (N−k)th-order processing element which is congruent to every other (N−k)th-order processing element for the same value of k, and has a shape substantially geometrically similar to the shape of each (N−k)th-order processing element for all other positive integer values of k. Each Nth-order processing element can receive energy substantially evenly thereover and can transmit the energy therefrom.

In the case of two-dimensional arrays of two-dimensional processing elements, this structure has the advantage in addition to facilitating a linear ordering of signals from an array as discussed above, that the shapes of the processing elements are relatively irregular as compared to conventional processing elements of this kind, e.g. pixels on a CRT screen, LCD displays, CCD sensor arrays, and therefore reduce aliasing of the type described above.

Moreover, the adjacency conditions for the linear ordering of the signals from two-dimensional displays and sensors as described above insures that properties of a two-dimensional image signal which are spatially localized remain localized after the linear ordering and this feature of the invention provides a further automatic antialiasing for and of displays that are presented at scales that are more coarse than the finest scale available in the data of the original image signal.

In one group of preferred embodiments the processing elements are CCD's having either a rectangular shape with adjacent sides in the ratio of $1:\sqrt{2}$ or one of two fractal shapes to be described below. Signals stored by the individual CCD's are linearly ordered either by connecting them successively to transfer members in the desired order or by linearly reordering them in a signal processing unit. The linearly ordered or reordered signals are then input to a Haar transform signal processor where a one-dimensional Haar transform is performed. In all embodiments of the invention, an appropriate clock (not shown in the drawings) is provided to control the timing of signal processing performed.

BRIEF DESCRIPTION OF THE DRAWINGS

These and other features and advantages of the invention will be better understood from consideration of the following detailed description of the preferred embodiments taken with the accompanying drawings in which:

FIG. 1A show linear graphs of the first eight Haar basis functions;

FIG. 1B is a two-dimensional representation of the two-dimensional product Haar transform basis of functions;

DESCRIPTION OF THE PREFERRED EMBODIMENTS

Figure 2:
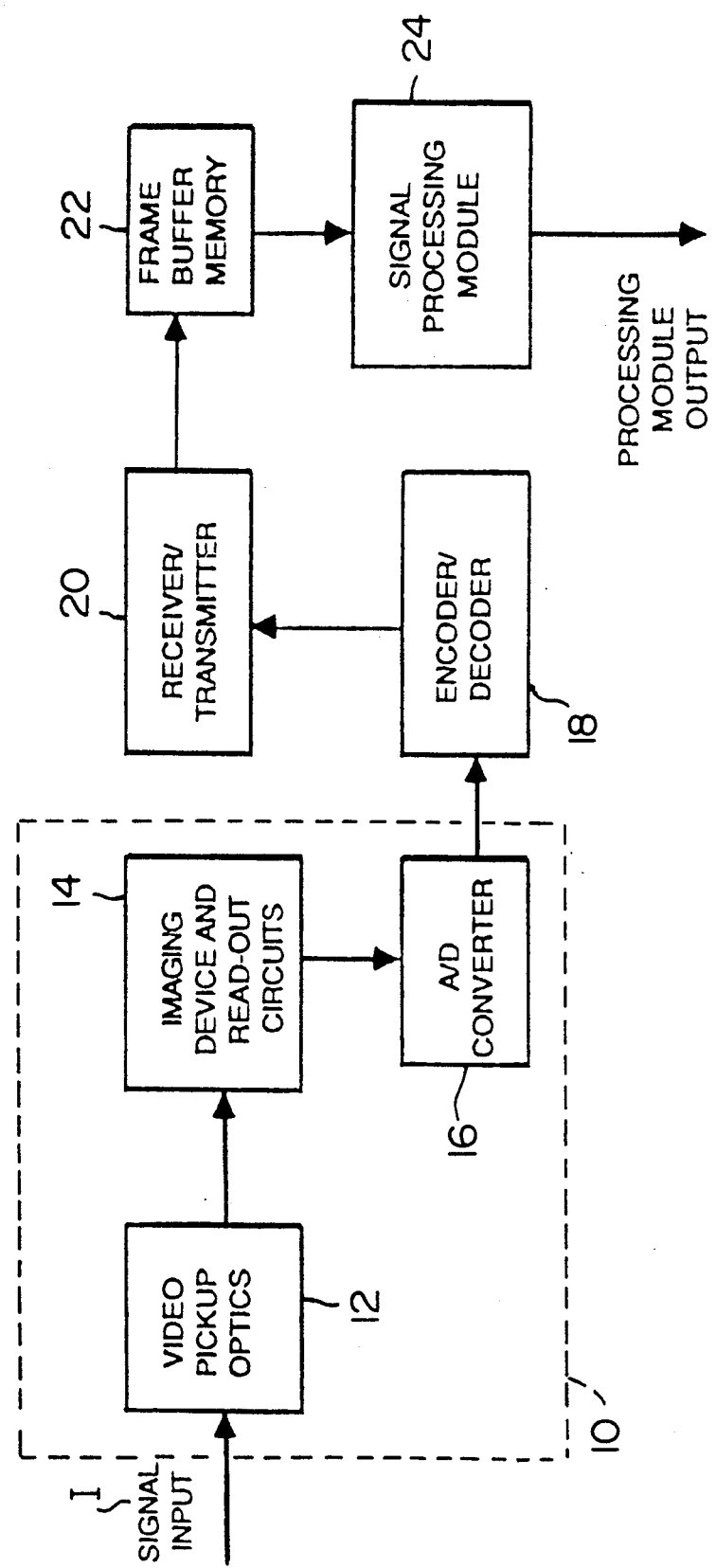
FIG. 2 is a block diagram of a signal sensing device in accordance with the present invention.

Referring first to FIG. 2, there is shown a general block diagram of an optical signal processing device in accordance with the invention similar in broad construction to that described in the inventor's U.S. Pat. No. 4,574,311, which is incorporated herein by reference. A two-dimensional optical image I is captured by a video camera 10 which includes video pickup optics 12 and novel imaging device and read-out circuits 14, which sample the captured image and reads out the sampled output and includes a two-dimensional array of $2^N$ electro-optical sensors such as CCD's which generate a voltage proportional to the illumination on the respective CCD elements, shaped and arranged in a manner to be described in detail below, transfer members and standard read-out electronics used with commercially available equipment. The electrical output of the sensors is output in a conventional manner to a relabeling encoder/decoder 18 through a conventional analog-to-digital converter 16 in the camera 10. In the relabeling encoder/decoder 18 the signals from the individual sensors are reordered in a manner to be described in detail below and output to a signal processing module 24 through a receiver-transmitter 20 and frame buffer memory 22. In the signal processing module, a one-dimensional Haar transform is performed on the linearly ordered signals representative of a frame signal from the two-dimensional array of sensors for purposes of analysis of the frame signal.

Figure 3:
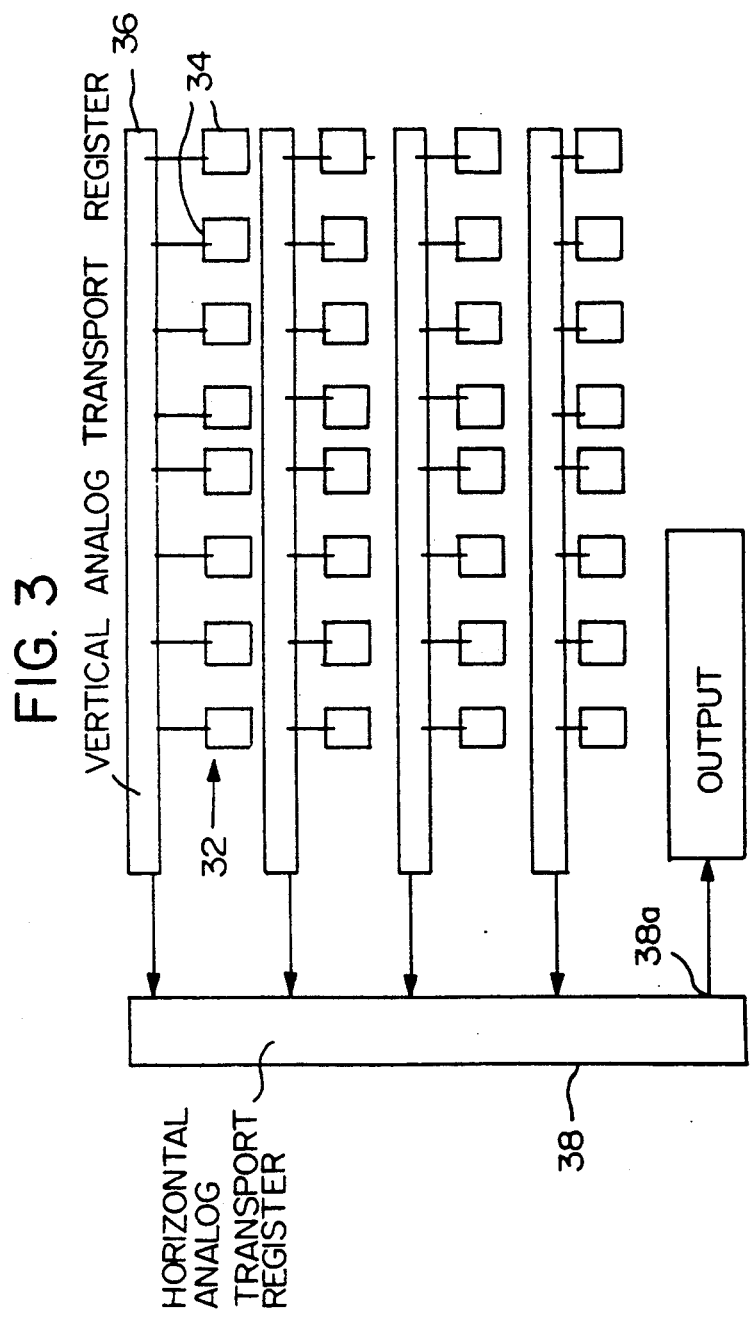
FIG. 3 is a schematic illustration of a conventional CCD array which may be used in accordance with one embodiment of the present invention.

Referring to FIG. 3, the array of sensing elements 34 may be a conventional rectangular array of CCD sensors formed on a silicon substrate. As described below, in this embodiment the sensor elements are rectangularly shaped with sides in a ratio of $1:\sqrt{2}$, or otherwise shaped groups of adjacent sensor elements are aggregated to approximate sensor areas of one of two particular fractal shapes.

Aside from the shapes and arrangement of the individual sensing elements, the imaging device and readout circuits of this embodiment have a conventional structure and operation. See, for example, FIGS. 6 and 7 and columns 6 and 7 of U.S. Pat. No. 4,574,311. The information represented by the voltages associated with the collection of CCD sensing elements is outputted from the array by simultaneously shifting the voltages from each row 32 of sensing elements 34 to vertical analog transport registers 36 located on the substrate between the respective rows of sensing elements, and then shifting the voltages from the vertical analog transport registers 36 into a horizontal analog transport register 38. The signal values in the horizontal analog transport register are subsequently shifted into the output channel of the sensor device for transmission to the signal processing module.

When radiation is incident on a sensing element 34, it is absorbed in the silicon causing the generation of a linearly proportional number of free electrons (called a charge-packet) in the specific area illuminated. The pattern of incident radiation intensity is a focused light image from the video pickup optics 12 viewing a scene, and therefore the charge-packets created in the finite illuminated areas of the array are a faithful reproduction of the scene projected on its surface.

After an appropriate exposure time during which the incident light on each sensing element 34 generates a time and intensity proportional electron charge-packet, the charge-packets are simultaneously transferred by charge-coupling to the corresponding parallel vertical analog transport registers 36. Each charge-packet corresponds to a pixel, and when transferred to the adjacent vertical transport register continues to faithfully represent the total sensed radiant energy which was absorbed in the sensor. The vertical transport registers 36, which are loaded with lines of picture information in the form of charge-packets from the lines of sensors 34, are rapidly clocked by a pulse input to deliver the picture information in serial format to the horizontal analog transport register 38. At the sam time the sensing elements 34 begin integrating the next line of incident image information.

The horizontal analog transport register 38, upon receipt of a pulse input, outputs at terminal 38a an entire frame of video information from each integration period in the form of a series of lines of video signal. This signal is converted from analog to digital form in analog-to-digital converter 16. The order of the signal values corresponds to a consistent ordering in each row of the CCD sensor array, say from right to left, and an ordering of the rows, say from top to bottom, which in combination impose a one-dimensional linear ordering on the two-dimensional array of signal sensing elements. This one-dimensional linear ordering is conventionally used only to transport the signal values from the sensor array to the subsequent processing stage, which typically includes an analog-to-digital converter followed by a two-dimensional frame grabber or other digital storage unit which relabels the input signal to coincide with its original geometry. The temporary linear ordering to the input signal performed by the vertical and horizontal transport registers disrupts the relationships of distance between sensing elements so that adjacent signals in the linear ordered outputs of the signal sensing elements do not in general correspond to adjacent inputs to the two-dimensional sensor array.

In this embodiment of the invention, the encoder/decoder 18 which reorders the signal information into a one-dimensional array for subsequent transmission to signal processing module 24 can be implemented as a software algorithm running on a standard microprocessor, or as a fixed look-up table implemented in ROM or PROM or as a hardware circuit which produces as output the one-dimensional label that corresponds to a given two-dimensional sensing element input, or two-dimensional sensing element coordinates that correspond to a one-dimensional label input as described below.

Figure 4:
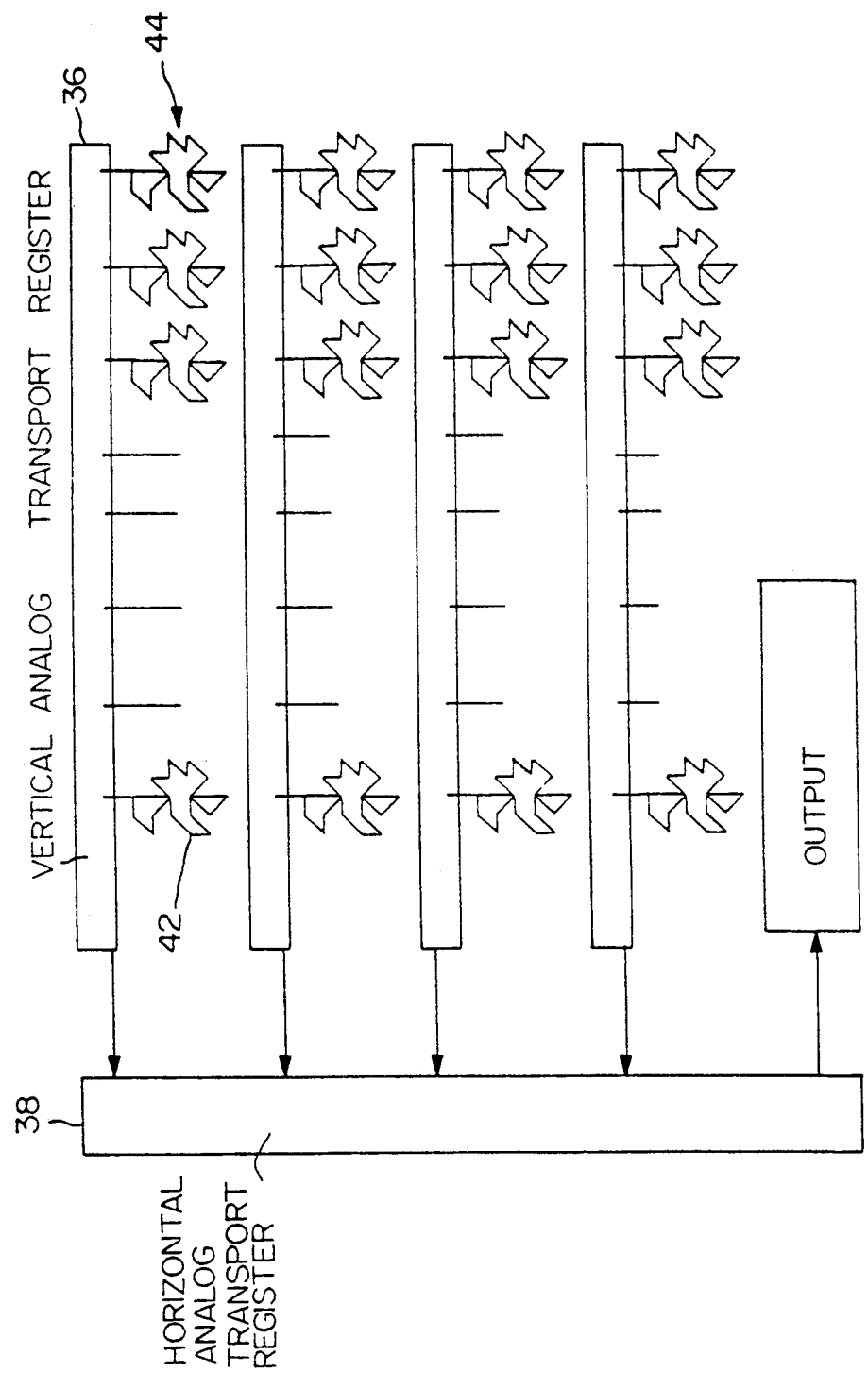
FIG. 4 is a schematic illustration of a fractal CCD sensor array with conventional transfer members, in accordance with another embodiment of the invention.

In another embodiment, as illustrated in FIG. 4, the individual sensor elements 42 have one of two fractal shapes to be described below, and are arranged in an intermeshing manner in rows 44 and columns as in the prior embodiment. The operation of this embodiment is substantially identical to that previously described and will not be repeated. The intermeshing of the fractal shaped elements is illustrated, for example, in FIGS. 6 and 7.

In another embodiment of the invention, rather than relabeling or reordering the output signals of the sensor array in the encoder/decoder device as in the embodiments described above, the signals are appropriately ordered automatically as they are output from the array so that a relabeling or reordering is not required to be performed by the encoder/decoder. This may be accomplished by forming the array of CCD sensing elements on a substrate and providing transfer members such as analog transport registers on the substrate and coupled to successive sensing elements for transferring signals stored on the elements in the desired order of the signals.

Although the preferred embodiments described herein relate to processing of two-dimensional optical signals, the invention is not so limited but is directed to the processing of multi-dimensional signals not limited to optical signals or to two-dimensional signals and the processing elements which convert optical signals to electrical signals commonly known as transducers. Accordingly, in further description of the invention, the elements corresponding to the optical sensors in the preferred embodiment are identified as "processing elements" in order to broadly designate any processor of a multi-dimensional signal having the features described.

Figure 5:
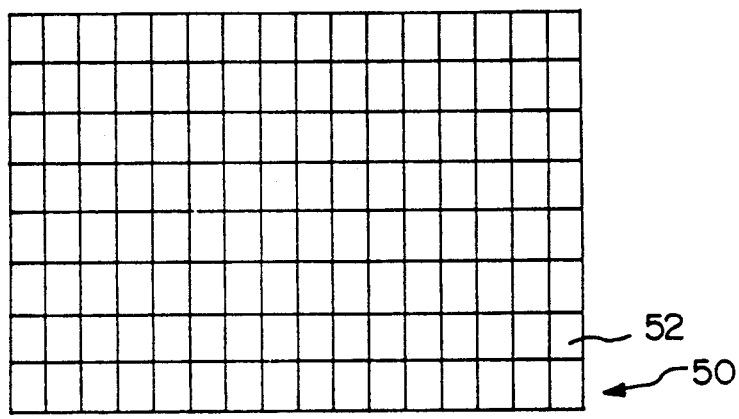
FIG. 5 is a schematic illustration of an array of rectangular processing elements in accordance with a further embodiment of the invention.

In the case of two-dimensional processing elements, the shapes and arrangement of processing elements having the features as described above are such that every $(N-k)$th-order processing element $(0<k<N)$ may be partitioned into two disjoint congruently shaped processing elements of equal area and having the same shape as that of the $(N-k)$th-order processing element. As a general principle, considering the areas of each processing element of whatever order as a set $S_b$ of areas of processing elements of an elemental size, which can be partitioned into disjoint congruent sets $S_{b0}$ and $S_{b1}$ of equal area and having the same shape as that of the set $S_b$, if $S_b$ has a piecewise smooth boundary, then it can be mathematically proved that $S_b$ is a rectangle the lengths of whose adjacent sides are in the ratio $1:\sqrt{2}$. Thus, the only conventional geometric shapes associated with euclidean geometry (and thus having piecewise continuous boundaries) having the properties of the processing elements of the invention, is the rectangle the lengths of whose adjacent sides are in the ratio $1:\sqrt{2}$. A signal processing device with a rectangular array of Nth-order processing elements of this shape and arrangement constitutes one embodiment of the invention. Such an array 50 of rectangular Nth-order processing elements 52 such as CCD's or LCD's is illustrated in FIG. 5.

Figure 6:
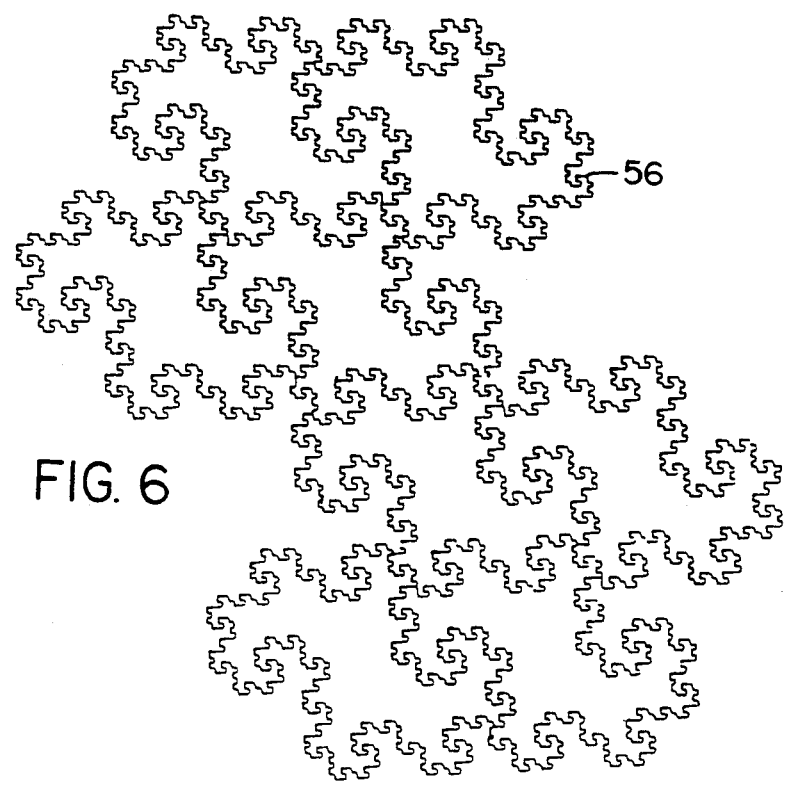
FIG. 6 is a schematic illustration of an array of one type of approximately fractal shaped processing elements in accordance with another embodiment of the invention.
Figure 7:
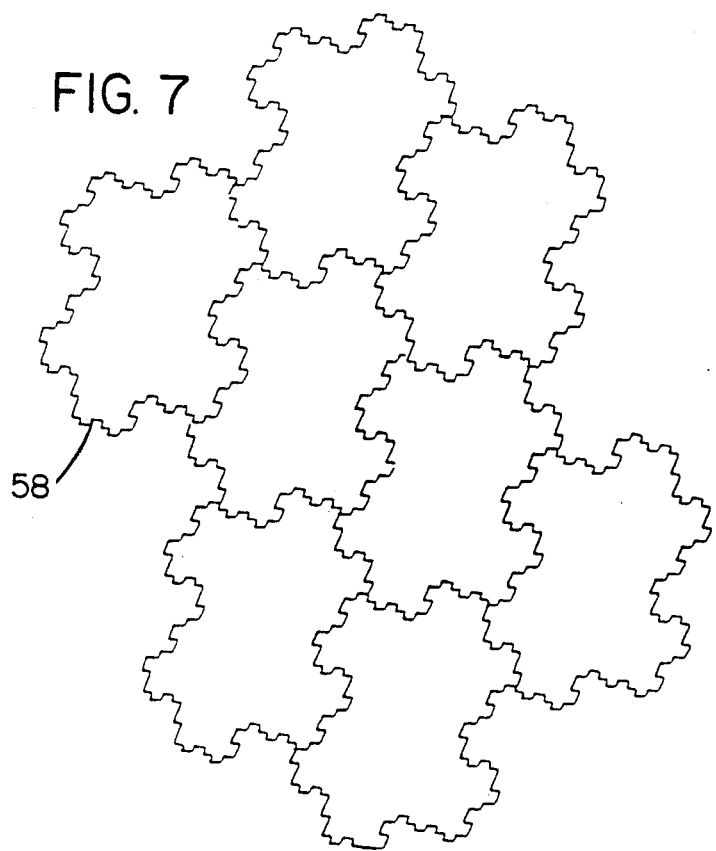
FIG. 7 is a schematic illustration of another type of approximately fractal shaped processing elements in accordance with still another embodiment of the invention.

There are, however, as noted above, two fractal geometrical shapes for the two-dimensional processing elements which satisfy the condition that the area thereof may be partitioned into two disjoint congruent areas having the same shape as the area from which it was partitioned. These shapes 56 and 58 which are respectively illustrated in approximate form in FIG. 6 and FIG. 7, are not easily manufactured with exactness, but may be approximated and constructed in a practical manner as illustrated respectively in FIGS. 8 and 9 from aggregates 60 and 70 of $2^P$ subelements 62 and 72 ($P=7$ in these examples) respectively of square shapes, and of parallelogram shapes whose adjacent sides 76 and 78 have lengths in the ratio $\sqrt{2}:1$ and form an acute angle of magnitude $\arctan(\sqrt{7})$. Such approximations are useful since in practical applications of the invention where the processing elements may be CCD's in a video camera or LCD's in a video display, the number of processing subelements $2^{N+P}$ may be more than 256,000 and thus, for $P=7$, N is greater than 10. Also, in the case of the embodiment using square subelements 62, the subelements may be formed from a conventional array of square CCD's such as a Fairchild CCD-221.

Assuming that $2^P$ subelements 62 or 72 (P being an integer greater than 2) are used to form an individual Nth-order processing element of approximate fractal (pseudo-fractal) shape, the positions of the subelements in an Nth-order processing element and the positions of the subelements and Nth-order processing elements which they define in an overall array of $2^N$ Nth-order processing elements, may be determined by the following formulae:

Defining a Cartesian x,y coordinate system for the plane with the subelements arrayed with two opposite sides parallel to an x axis with a scale such that these sides have unit length, the $2^N$ Nth-order processing elements forming a two-dimensional array, the location of each subelement being defined by the coordinates of its upper left hand corner and a first subelement of a first Nth-order processing element having coordinates (0,0), the formula:

$$x + iy = \sum_{j=1}^{N} b_j(\tau)^{N-j}, \qquad (2)$$

defines the positions (x,y) of the Nth-order processing elements wherein $b_j$ is the jth order bit of the sequence of bits $b_1, b_2, b_3, \ldots, b_N$, $\tau$ is a complex number which differs for the two embodiments and i represents the square root of $-1$; and the formula:

$$(x + \Delta x) + i(y + \Delta y) = \sum_{j=1}^{N+P} b_j(\tau)^{N+P-j}, \quad (3)$$

defines the positions of the subelements with the subelements being located at the coordinates $(x+\Delta x, y+\Delta y)$ wherein $b_j$ is the jth ordered bit of the sequence of N bits $b_1, b_2, b_3, \ldots b_{N+P}$, $\tau$ is again the complex number which differs for the two embodiments and again i represents the square root of $-1$. The above formulae can also be used to define the location of subelements of Nth-order processing elements of the embodiment having rectangular processing elements.

In the embodiment in which the subelements are square shaped, $\tau = 1-i$, in the embodiment in which the subelements are parallelogram shaped, $\tau = (1-i\sqrt{7})/2$ and in the embodiment in which the processing elements are rectangular, the subelements are similarly shaped rectangularly and $\tau = -\sqrt{2}$.

Figure 8:
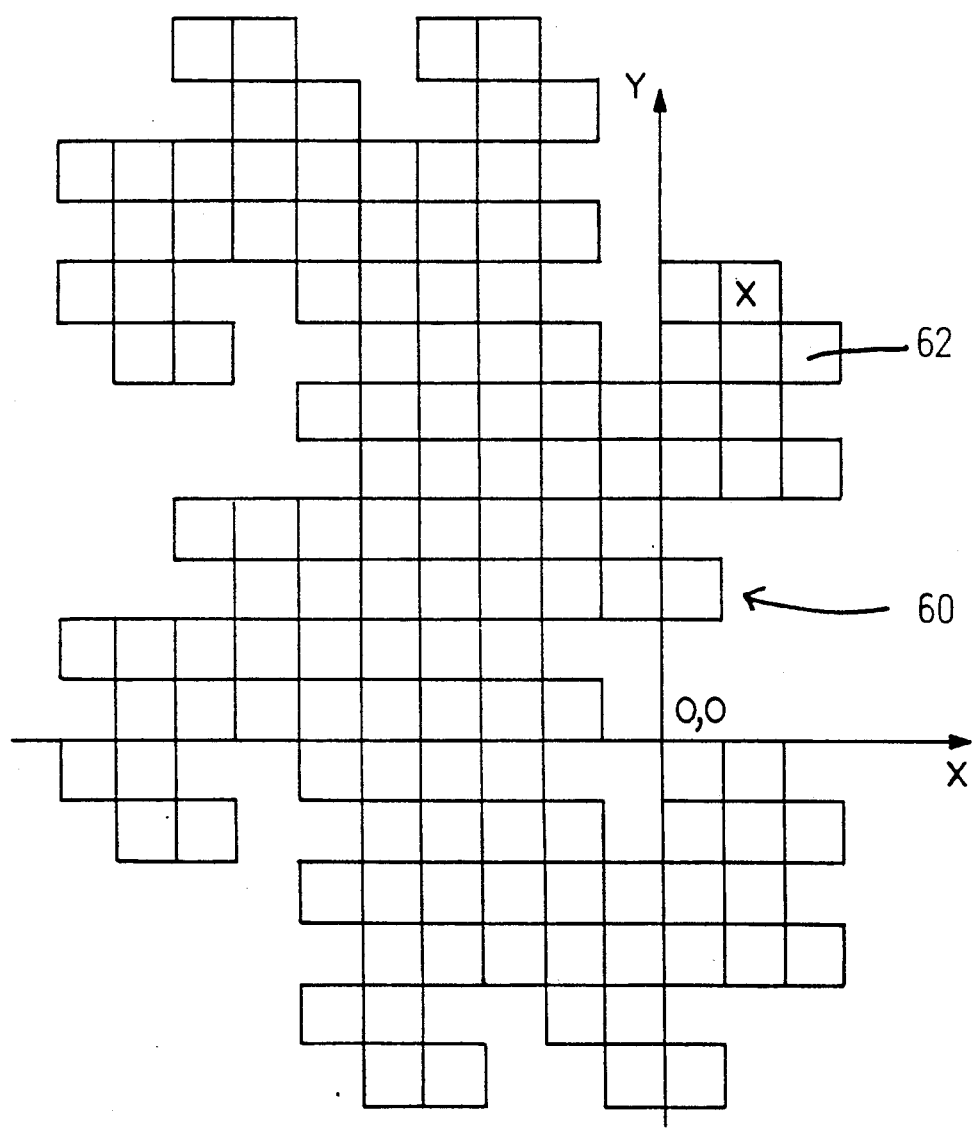
FIG. 8 is a schematic illustration of an array of square processing subelements approximating a fractal shaped processing element in accordance with another embodiment of the invention.
Figure 9:
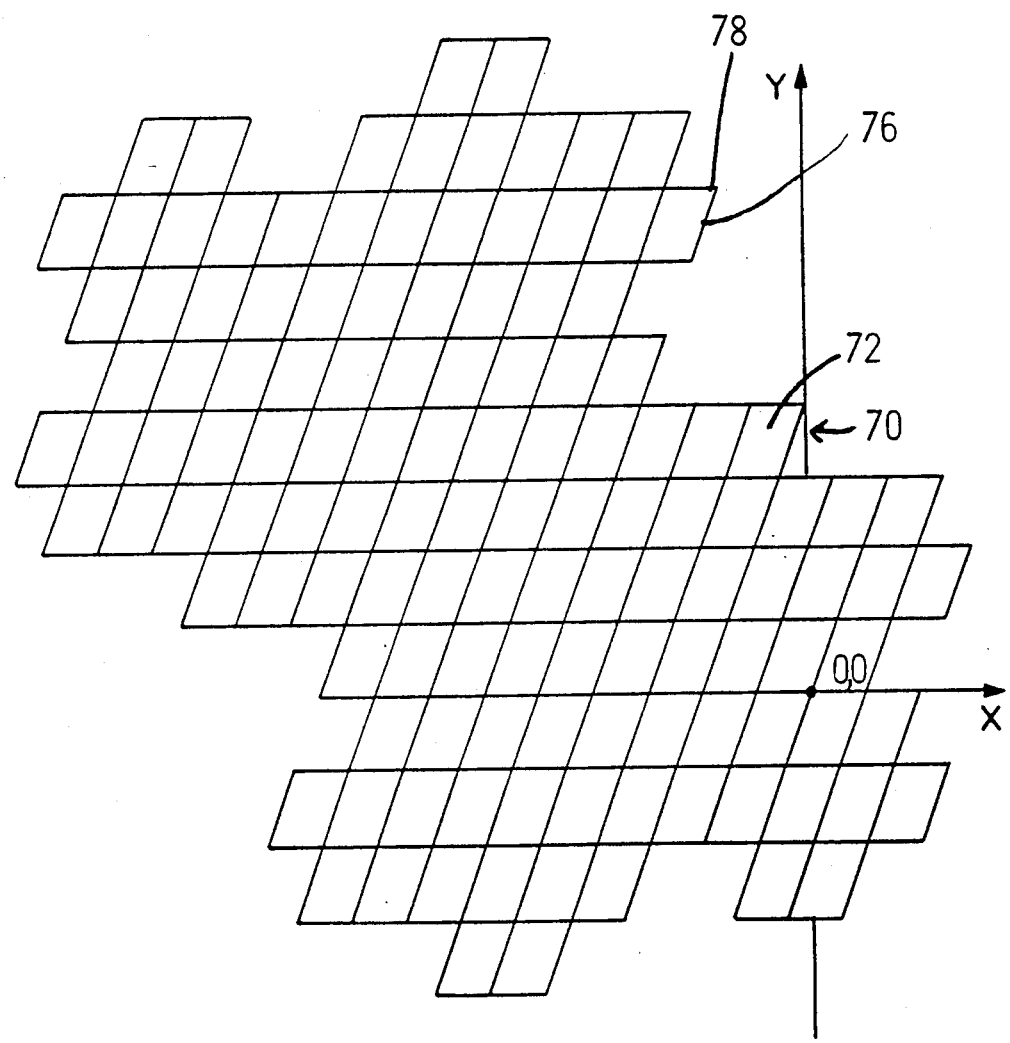
FIG. 9 is a schematic illustration of an array of parallelogram-shaped processing subelements forming an approximately fractal shaped processing element in accordance with a still further embodiment of the invention.

Thus, for example, for the embodiment with square subelements illustrated in FIG. 8, wherein P=7, and $\tau = 1-i$, and taking for simplicity the case where N=8, the formula (3) for the subelements of the 8th-order processing element located at the coordinates (0,0) (for which $b_1 = b_2 = \ldots = b_8 = 0$), becomes $$\Delta x + i(\Delta y) = \sum_{j=9}^{15} b_j(1-i)^{15-j} \quad (3a)$$

Then, taking as an example, the binary (N+P) - digit number b=0,0,0,0,0,0,0,1,0,0,0,0,0,1, that is, $b_9 = b_{15} = 1$, $b_1 = b_2 = \ldots = b_8 = b_{10} = \ldots = b_{14} = 0$, $$\Delta x + i\Delta y = (1-i)^6 + (1-i)^0 = 1 + 8i.$$

and thus $\Delta x = 1$ and $\Delta y = 8$. The subelement at this location is marked with an "X" in FIG. 8.

In all three embodiments, the formulae (2) and (3) also define a linear ordering of the signals from the Nth-order processing elements and from the subelements in the linear order of the array in accordance with the invention as discussed above. In formula (2), the sequence of bits $b_1, b_2, b_3, \ldots, b_N$ represents the relative positions of the signals in the linear ordering of the signals from the Nth-order processing elements whose upper left corner is located at the coordinates (x,y). In formula (3), the sequence of bits $b_1, b_2, b_3, \ldots, b_{N+P}$ represents the relative position of the signals in the linear ordering of the signals from the processing subelements whose upper left corner is located at the coordinates $(x+\Delta x, y+\Delta y)$. Thus, the relabeling encoder/decoder 18 in the embodiment having conventional transfer members 36 and 38 and the transfer members themselves in the embodiment in which the transfer members are coupled between the sensing elements on a substrate, implement the labelling or reordering relationship contained in either formula (2) or formula (3) by making the signal from the Nth-order processing element or processing subelement whose integer cartesian coordinates are (x,y) or $(x+\Delta x, y+\Delta y)$, respectively, correspond to the linear array position whose coordinate is the integer b whose binary expansion $b_1, b_2, b_3, \ldots, b_N$ or $b_1, b_2, b_3, \ldots, b_{N+P}$ is determined by the formula (2) or the formula (3).

Figure 12:
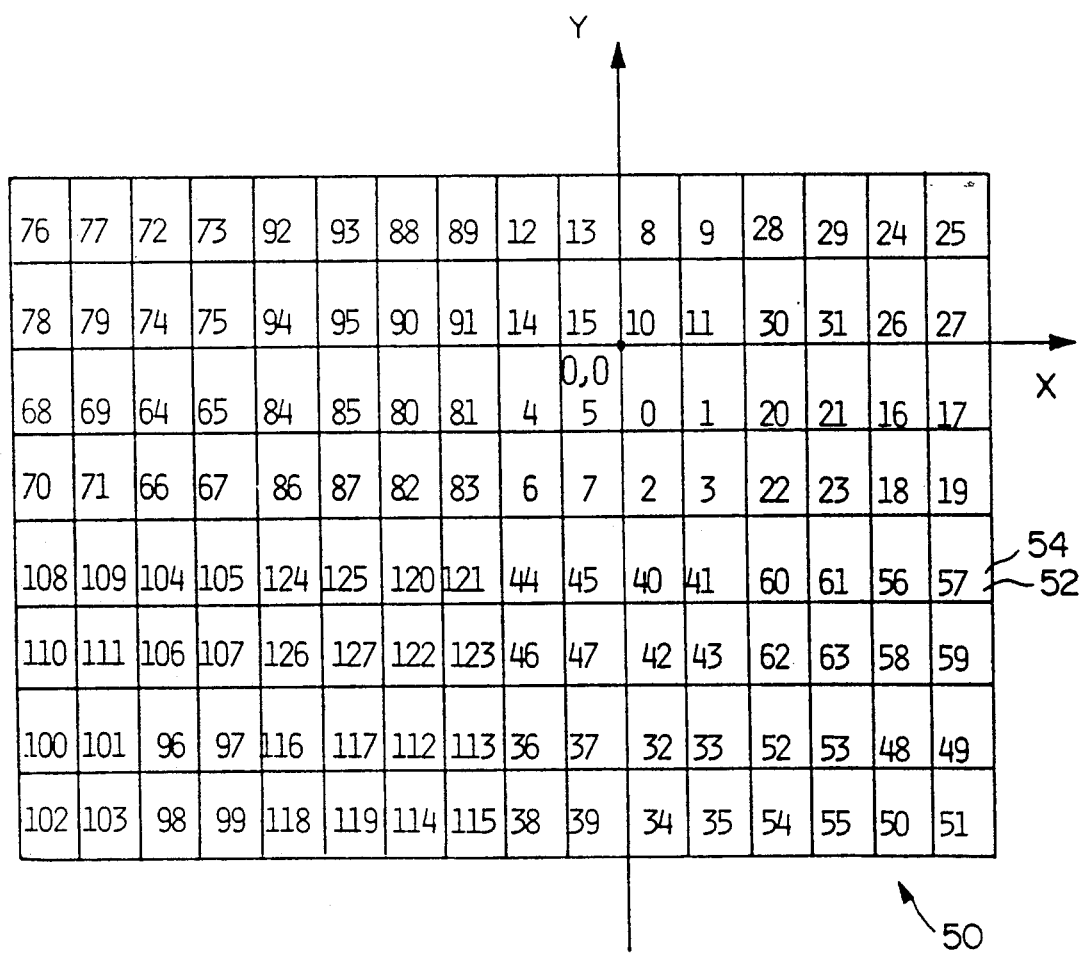
FIG. 12 is a schematic illustration of the array of processing elements shown in FIG. 5 indicating a linear ordering of the signals from the elements in accordance with an embodiment of the invention.
Figure 10:
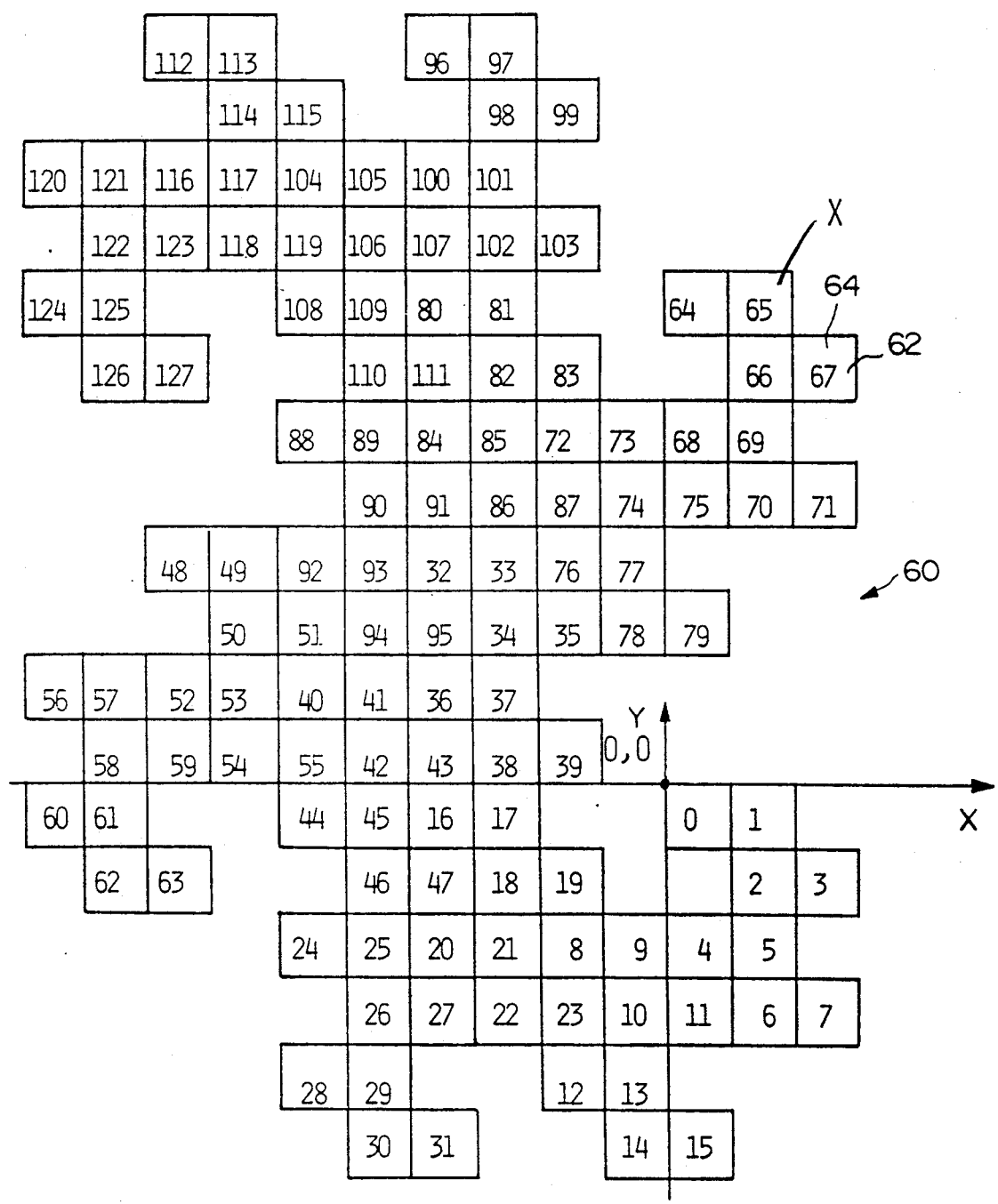
FIG. 10 is a schematic illustration of square processing subelements similar to those illustrated in FIG. 8 indicating an ordering or relabeling of signals from the subelements in accordance with an embodiment of the invention.
Figure 11:
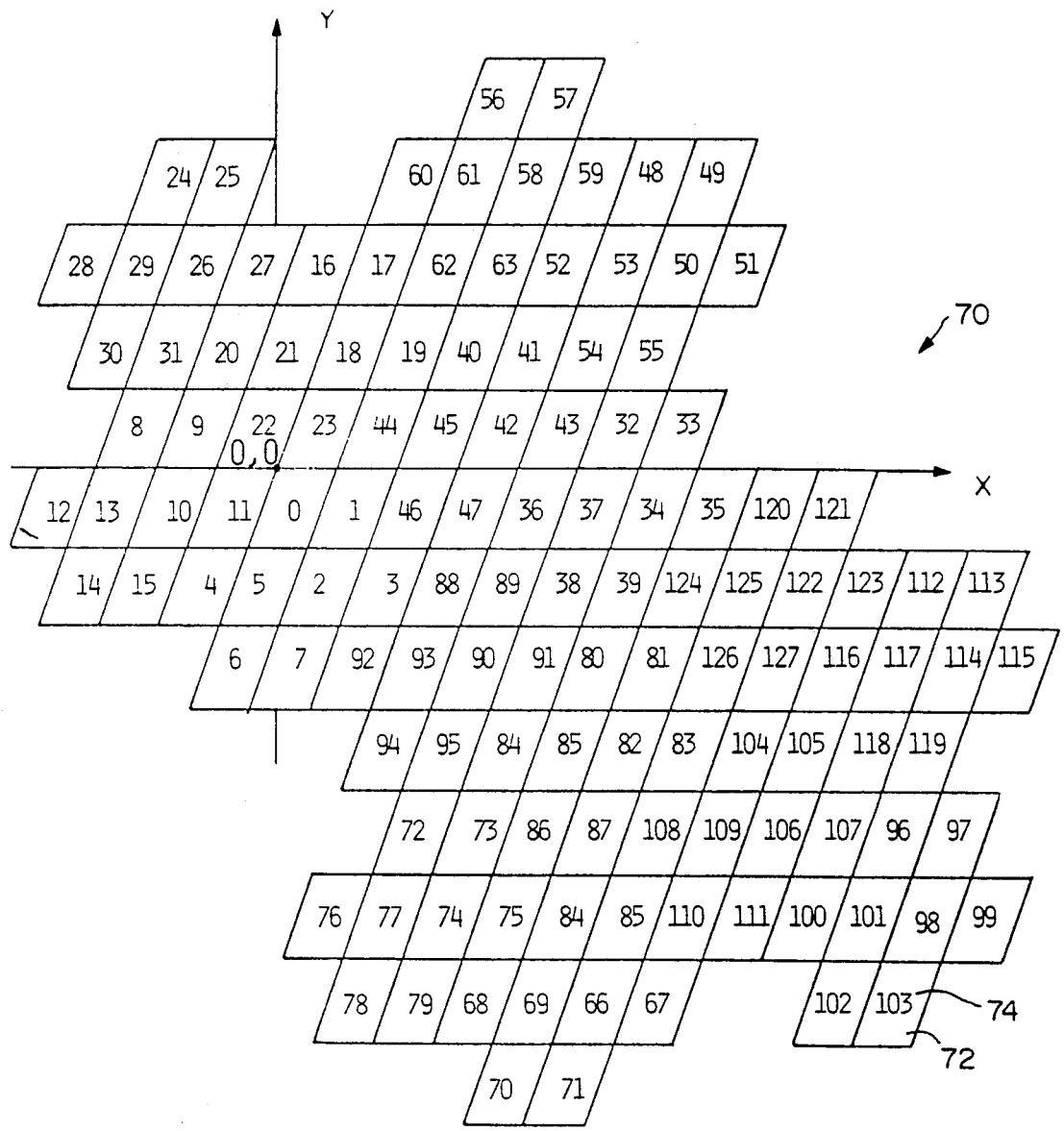
FIG. 11 is a schematic illustration of the parallelogram shaped subelements shown in FIG. 9 indicating the ordering or relabeling of the signals from the subelements in accordance with an embodiment of the invention.

FIGS. 10, 11 and 12 illustrate the linear ordering of the signals from the subelements of a single Nth-order processing element in accordance with the three embodiments described above. FIG. 10 schematically illustrates an Nth-order processing element 60 located at the coordinates (x,y) in an array of $2^N$ Nth-order processing elements, consisting of 128 ($2^7$) square subelements 62 numbered with numerals corresponding to the linear ordering of the signals from the subelements. The ordering of the signals is in accordance with formula (3) above with $\tau = 1-i$ and accordingly, the numbering of subelements begins with the subelement located at coordinates (x,y) and extends with successively increasing values of the partial sequence of binary digits corresponding to the subelements of a single Nth-order processing element, namely $b_{N+1}, b_{N+2}, b_{N+3}, \ldots, b_{N+7}$, to the locations of the respective subelements having the coordinates $(x+\Delta x, y+\Delta y)$ defined by the formula (3).

It is to be noted that the orientations of the Nth-order processing members in the array of FIG. 10 are all the same but depend on P. For each increase by 1 of the order of a processing subelement, its orientation is rotated by minus 45°. Thus, FIG. 10 illustrates only one of 8 possible orientations of the pseudo-fractal shaped Nth-order processing element illustrated therein, e.g., P=7. For the same reason, each (N−k)th order processing element will have one of 8 possible orientations depending on the value of k. This rotation naturally follows from the mathematical formulae (2) and (3) which are sums of the powers of the complex quantity $(1-i)$ which is a vector quantity in the complex plane extending at a −45° angle to the real axis.

FIG. 11 similarly illustrates by numerals, the linear ordering of the signals from the respective 128 subelements 72 (P=7) of the Nth-order processing elements 70, and FIG. 12 similarly illustrates by numerals, the linear ordering of the signals from the respective processing elements 52 of the array 50. The ordering of all of the fractal shaped Nth-order processing elements and subelements thereof may by similarly illustrated for each embodiment by further extending the numerals for all successive values of the sequence $b_1, b_2, b_3, \ldots, b_{N+P}$. Again, the orientations of the Nth-order processing elements in the array of the embodiment illustrated in FIG. 11 are all the same, but depend on P. The orientation in FIG. 11 of course corresponds to P=7. For an increase by 1 of the order of a processing subelement, its orientation is rotated by arctan($-\sqrt{7}$). Neither 360° nor an integer multiple of 360° is evenly divisible by arctan ($-\sqrt{7}$) and thus no two values of P give the same orientation. For the same reason, the (N−k)th order processing elements will have different orientation depending on the value of k.

Figure 13:
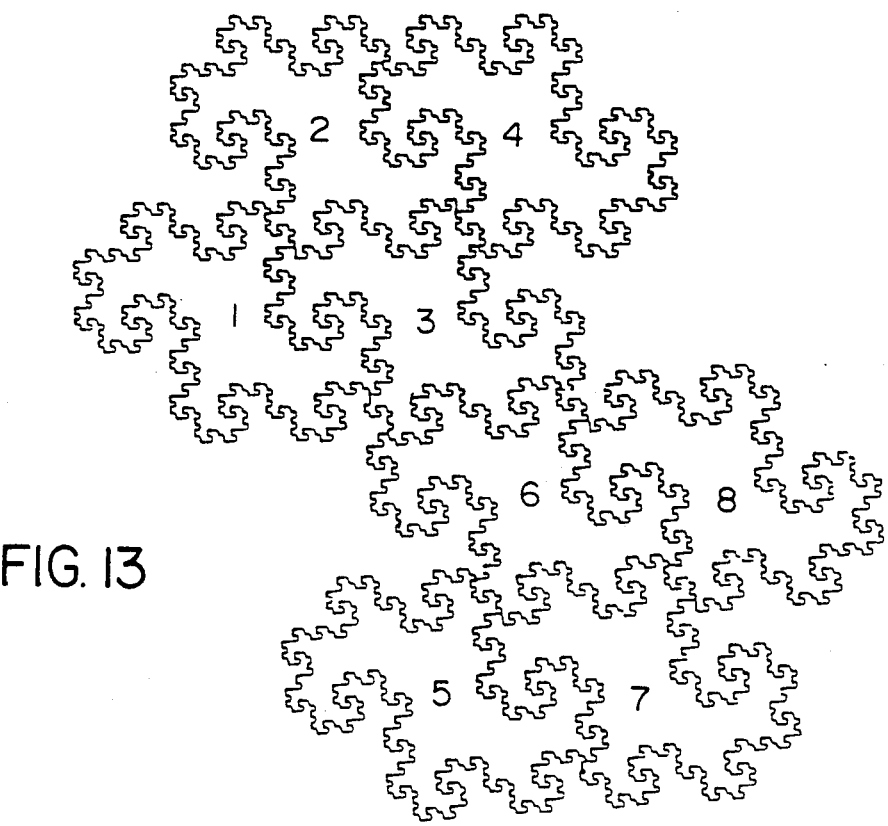
FIG. 13 schematically illustrates the ordering of the signals from the array of fractal shaped processing elements illustrated in FIG. 6, in accordance with an embodiment of the invention.
Figure 14:
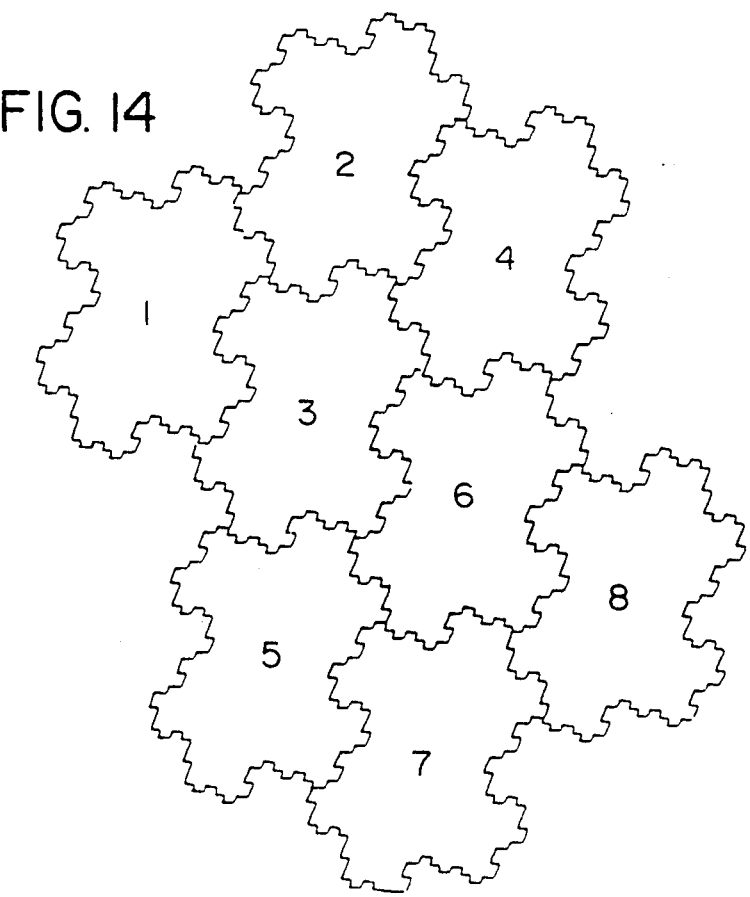
FIG. 14 is a schematic illustration of the ordering of the signals from the fractal shaped processing elements illustrated in FIG. 7, in accordance with an embodiment of the invention.

Another method of constructing a signal processing device using processing elements of approximately fractal shape as defined by the above formulae for $\tau = 1-i$, and $\tau = (1-i\sqrt{7})/2$, but even more precisely fractal in shape (by having P a very large number in the above formula (1)) is to draw such a fractal for P large as by a computer-driven high resolution printing device, then reducing the printed image photographically by a factor of $2^{P/2}$ and finally constructing the processing device from $2^N$ Nth-order process elements which are congruent copies of the reduced image. Conventional photolithographic processes can be used to create masks for fabricating CCD integrated circuits or LCD arrays whose sensing elements have the geometrical shape and positions prescribed herein. The linear ordering of the signals from such fractal shaped Nth-order processing elements as described above is illustrated in a manner similar to FIGS. 10, 11 and 12, in FIGS. 13 and 14.

The linear ordering of the signals from the Nth-order processing elements prescribed by formula (2) insures that the set S of the processing elements of the array can be recursively partitioned into congruent subsets that are approximately similar to S as described above. By means of the relabeling or reordering, the processing element that corresponds to the coordinates (x(b),y(b)) can be identified with the subinterval $[b/2^N,(b+1)/2^N]$ of the unit interval [0,1] of real numbers.

A signal incident upon a two-dimensional sensor array S will produce an output signal F from the sensor array. In general, F will be a vector-valued function (dependent on the x and y position variables). If the sensor array is responsive to a single input variable, such as gray level intensity of illumination, then the sensor output function F will be constant on each sensing element because the output of a sensing element represents an integration of inputs received throughout its signal sensitive surface. If the sensing elements are labelled by the integers $0, 1, 2, ..., 2^N-1$ by means of the relabeling encoder/decoder 18 in the embodiment having conventional transfer members 36 and 38, or the transfer members themselves in the embodiment accomplishing reordering with the transfer members, then, without loss of generality, the sensor output signal F can be considered as a numerical valued function defined on the unit interval [0,1] such that F is constant on each of the $2^N$ subintervals $[b/2^N,(b+1/2^N], 0 \leq b \leq 2^N$.

The signal processing module 24 accepts as input the sensor array signal F and produces as its output the Haar transform of F. The signal processing module 24 calculates the Haar transform of the vector valued function of two variables F(x,y) considered as a function of one variable, by means of the relabeling identification that enables F(x,y) to be considered as F(z(w)) where $z=x(w)+iy(w)$ and w is a rational number between 0 and 1 with denominator $2^N$.

The function F can be expressed by the formula:

$$F(x(b),y(b)) = \Sigma (HF)_a h_a(z(b)) \quad (4)$$

where the coefficients (HF) are the Haar transform and the sum runs over all bit sequences a. These quantities are calculated by the signal processing module by means of a serial program operating on a general purpose processor, or alternatively may be by means of a special purpose concurrent computing system.

For a two-dimensional signal processed by a two-dimensional array or set S of $2^N$ Nth-order processing elements of the shapes and arrangement of the invention as described above and whose output is linearly ordered in accordance with the invention as described above and defined for example in formula (2), the Haar basis functions $h_i(\chi)$ are such that every processing element of every order (first order through Nth order) corresponds to one and only one basis function, the basis function corresponding to a particular processing element having a non-zero value for and only for values of the independent variable $\chi$ corresponding to that particular processing element.

This fact, which gives rise to the ability to localize signal energy by applying the Haar transform to an appropriate linear ordering of the outputs from an appropriately-arranged two-dimensional array of Nth-order processing elements as described above, becomes apparent from an analysis, which follows, of the processing elements in sets and subsets and a generalized version of the Haar transform.

The set S of $2^N$ Nth-order processing elements may be repetitively partitioned N times, and labeled in a binary manner, so that the set S is partitioned in half into adjacent subsets $S_0$ and $S_1$, subset $S_0$ is partitioned in half into adjacent subsets $S_{00}$ and $S_{01}$, subset $S_1$ is partitioned in half into adjacent subsets $S_{10}$ and $S_{11}$, and in general subset $S_b$ is partitioned in half into adjacent subsets $S_{b0}$ and $S_{b1}$, where b represents a binary number, the number of bits of which g corresponds to the number of partitions performed to arrive at the subset $S_b$ and may be indicated as $b_1, b_2, ...., b_g$. This subdivision produces the aggregates of Nth-order processing elements described above in which an aggregate defining an (N−k)th-order processing element consists of $2^k$ Nth-order processing elements. Thus, the number of bits g of the label identifying the subset $S_b$ is equal to the order N−k of the processing element formed by subset $S_b$.

Then, associated with each subset of Nth-order processing elements whose label consists of fewer than N bits is a basis function for the one-dimensional Haar transform that has the same label. In the expansion of the output signal produced by the entire array of Nth-order processing elements in terms of the Haar transform, the coefficient of the Haar basis function with a given label measures the degree to which the signal is localized on the subset of Nth-order processing elements that has the same label in comparison with other subsets of Nth-order processing elements that have the same scale, that is, processing element subsets whose labels have the same number of bits and therefore the same number of Nth-order processing elements. This is apparent from a consideration of the generalized Haar basis function $h_b$ that corresponds to the subset of $2^k$ Nth-order processing elements (the (N−k)th-order processing element) labeled by $S_b$, where the number of bits g of b is equal to or greater than 0 and less than N, and which is provided by the formula $$\begin{aligned} h_b(p) &= C_b/meas(S_{b0}) \text{ if } p \text{ is an element of } S_{b0}; \\ &= -C_b/meas(S_{b1}) \text{ if } p \text{ is an element of } S_{b1}; \\ &= 0 \text{ otherwise,} \end{aligned} \quad (5)$$

where meas(X) is the measure whose value is equal to the area occupied by the subset of Nth-order processing elements (the gth or (N−k)th-order processing element) X, and $C_b = \{(meas(S_{b0}) \cdot meas(S_{b1})/(meas(S_{b0})+meas(S_{b1}))\}^{\frac{1}{2}}$.

The distinct Haar basis functions that correspond to a given scale localize signal energy weighted according to the area of the subsets of processing elements. For conventional applications wherein signal energy is to be weighted equally with regard to its location in the image, it is of course desirable that all subsets of processing elements that correspond to the same scale of localization have the same area, as is the case in the present invention in which all processing elements are of the same shape and all processing elements of the same order are congruent. In this case, meas($S_b$) depends only on the number of Nth-order processing elements in the subset $S_b$, (or otherwise stated, the number of bits in b)

and on the total area of the array, and may be expressed as by the following formula:

$$meas(S_b) = 2^{-k} meas(S). \quad (6)$$

If this construction process were to be continued indefinitely by further subdivision to obtain arbitrarily long sequences of bits b and corresponding subsets $S_b$ of arbitrarily small area, then these functions together with the constant function $h^*(p) = 1/meas(S)$, where p denotes an arbitrary element of S, constitute a complete orthonormal system of functions on S. An arbitrary signal having finite energy can be mathematically represented by a linear combination of these basis functions.

Thus, the Haar transform when applied to linearly ordered signals obtained in accordance with the invention, identifies the signal energy contained in any order processing element ((N−k)th-order, $0<k<N$) which is of such spatial frequency a to be fully contained in such processing element by associating that signal energy with a single basis function of the Haar transform. Signal energy fully contained in an (N−k)th-order processing element has a constant positive or negative signal value in one of the two adjacent substantially abutting (N−k+1)th-order processing elements which comprise the (N−k)th order processing element and has a constant signal value of opposite sign but of the same magnitude as the value in the other (N−k+1)th-order processing element. Higher frequency signal energy may of course be fully contained in higher order (smaller) processing elements. Thus, when a Haar transform is performed on the signals from a matrix of, for example, Nth-order processing elements of rectangular shape in accordance with the invention, linearly ordered according to formula (2) above, the successive basis functions are as illustrated by an array of boxes having the rectangular shape of the array of Nth-order processing elements in accordance with the embodiment of FIG. 5, and with each box corresponding to a separate basis function, and having black, gray and white areas respectively indicating positive, zero and negative values of the function for values of the independent variable corresponding to the locations of the respective processing elements from which the signals are transmitted.

The invention now being fully described, it will be apparent to one of ordinary skill in the art that many changes and modifications can be made thereto without departing from the spirit or scope of the invention as set forth herein, and the same are intended to be comprehended within the meaning and range of equivalents of the appended claims.

What is claimed is:

1. A signal processing device, comprising $2^N$ successively adjacent substantially congruent Nth-order processing elements positioned on a surface, each of said processing elements comprising a transducing member, where N is a positive integer, each of said $2^N$ Nth-order processing elements being aggregatable into one of $2^{N-k}$ (N−k)th-order non-overlapping aggregates of $2^k$ successively adjacent Nth-order processing elements for all values of k, where $0<k\leq N$; the Nth-order processing elements of each (N−k)th-order aggregate substantially covering a substantially continuous portion of said surface and defining an (N−k)th-order processing element, being congruent to every other (N−k)th-order processing element for the same value of k, and having a shape which is substantially geometrically similar to the shape of each (N−k)th-order processing element for all other values of k; each Nth-order processing element receiving energy input thereto and converting said input energy to an output signal proportional to said input energy.

2. A signal processing device as in claim 1, which further comprises register means for receiving the output signals from said Nth-order processing elements, said register means storing said output signals and generating a series of register output signals each of which corresponds to the output signal of one of said Nth-order processing elements.

3. A signal processing device as in claim 2, wherein each of said Nth-order processing elements comprises at least one CCD element.

4. A signal processing device as in claim 1, which further comprises means for identifying the output signals from the respective Nth-order processing elements in which they were generated and linearly ordering the signals in a predetermined order such that for each (N−k)th-order aggregate each output signal generated by an Nth-order processing element among the $2^k$ Nth-order processing elements in a particular (N−k)th-order aggregate is contained in a same group of $2^k$ successively adjacent output signals after the linear ordering.

5. A signal processing device as in claim 4, further comprising means for performing a Haar transform on said output signals after the linear ordering thereof.

6. A signal processing device as in claim 1, wherein each of said Nth-order processing elements is rectangular, has a short side and a longer side, the ratio of its short side to its longer side being substantially $1:\sqrt{2}$, the longer of said sides of all of said Nth-order processing elements being parallel.

7. A signal processing device as in claim 4, wherein each of said Nth-order processing elements is rectangular, has a short side and a longer side, the ratio of its short side to its longer side being substantially $1:\sqrt{2}$, the longer of said sides of all of said Nth-order processing elements being parallel.

8. A signal processing device as in claim 7, wherein defining a Cartesian x,y plane with said Nth-order processing elements arrayed with their shorter sides parallel to an X axis, the longer sides parallel to a y axis perpendicular to the x axis, and with a scale such that the shorter sides have unit length on the x axis and the longer sides have a length substantially equal to $\sqrt{2}$, the $2^N$ Nth-order processing elements forming a two-dimensional array, the location of each Nth-order processing element being defined by the coordinates of its upper left hand corner and a first one of the Nth-order processing elements having coordinates (0,0), the formula:

$$x + iy = \sum_{j=1}^{N} b_j(-i\sqrt{2})^{N-j}$$

defines the positions of the Nth-order processing elements and the linear ordering of the signals therefrom wherein $b_j$ is the jth ordered bit of the sequence of bits $b_1, b_2, b_3, \ldots, b_N$ representing the relative position in the linear ordering of the Nth-order processing element located at the coordinates (x,y) and i represents the square root of $-1$.

9. A signal processing device as in claim 4, wherein said Nth order processing elements have a pseudo-fractal shape and wherein, defining a Cartesian x,y plane with said Nth-order processing elements arrayed thereon and the Nth-order processing elements thereby forming a two-dimensional array, the formula:

$$x + iy = \sum_{j=1}^{N} b_j(1-i)^{N-j}$$

defines the positions of the Nth-order processing elements and the linear ordering of the signals therefrom wherein $b_j$ is the jth ordered bit of the sequence of bits $b_1, b_2, b_3, ...., b_N$, the sequence of bits $b_1, b_2, b_3, ...., b_N$ representing the relative position of the signals in the linear ordering of the signals from the Nth-order processing elements with the Nth-order processing elements located at the coordinates (x,y) and i represents the square root of $-1$.

10. A signal processing device as in claim 9, wherein each of said Nth-order processing elements is formed of a plurality of successively adjacent square shaped processing subelements $2^P$ in number, P being an integer greater that 2, and wherein, defining a Euclidean x,y plane with said processing subelements arrayed with two opposite sides parallel to an x axis and the other two opposite sides parallel to a y axis perpendicular to the x axis and with a scale such that all of said sides have unit length the $2^N$ processing elements forming a two-dimensional array, the location of each processing subelement being defined by the coordinates of its upper left hand corner and a first one of the processing subelements having coordinates (0,0), the formula:

$$(x + \Delta x) + i(y + \Delta y) = \sum_{j=1}^{N+P} b_j(1-i)^{N+P-j}$$

defines the positions of the processing subelements with said processing subelements being located at the coordinates $(x+\Delta x, y+\Delta y)$ wherein $b_j$ is the jth order bit of the sequence of bits $b_1, b_2, b_3, ..., b_{N+P}$, the sequence of bits bits $b_1, b_2, b_3, ..., b_N$ representing the relative position of the signals in the linear ordering of the signals from the Nth-order processing elements located at the coordinates (x,y) given by the formula $$x + iy = \sum_{j=1}^{N} b_j(1-i)^{N-j},$$

and i represents the square root of $-1$.

11. A signal processing device as in claim 4, wherein said Nth-order processing elements have a pseudo-fractal shape and wherein, defining a Cartesian x,y plane with said Nth-order processing elements arrayed thereon and the processing elements thereby forming a two-dimensional array, the formula:

$$x + iy = \sum_{j=1}^{N} b_j((1-i\sqrt{7})/2)^{N-j}$$

defines the positions of the Nth-order processing elements and the linear ordering of the signals therefrom wherein $b_j$ is the jth ordered bit of the sequence of bits $b_1, b_2, b_3, ... ., b_N$, the sequence of bits $b_1, b_2, b_3, ..., b_N$ representing the relative position of the signals in the linear ordering of the signals from said Nth-order processing elements with (x,y) and i represents the square root of $-1$.

12. A signal processing device as in claim 11, wherein each of said Nth-order processing elements is formed of a plurality of successively adjacent parallelogram-shaped processing subelements $2^P$ in number, P being an integer greater that 2, and wherein, defining a first Cartesian x,y plane with said processing subelements arrayed with two opposite sides parallel to an x axis and the other two opposite sides parallel to a y axis perpendicular to a common line making an angle of substantially arctan $\sqrt{7}$ with the x axis and with a scale such that all of said sides have unit length the $2^N$ processing elements forming a two-dimensional array, the location of each processing subelement being defined by the coordinates of its upper left hand corner and a first one of the processing subelements having coordinates (0,0), the formula:

$$(x + \Delta x) + i(y + \Delta y) = \sum_{j=1}^{N+P} b_j((1-i\sqrt{7})/2)^{N+P-j}$$

defines the positions of the processing subelements with said processing subelements being located at the coordinates $(x+\Delta x, y+\Delta y)$ and the linear ordering of the signals therefrom wherein $b_j$ is the jth ordered bit of the sequence of bits $b_1, b_2, b_3, ...., b_{N+P}$, the sequence of bits $b_1, b_2, b_3, ... ..., b_N$ representing the relative position of the signals in the linear ordering of the signals from the Nth-order processing elements located at the coordinates (x,y) given by the formula $$x + iy = \sum_{j=1}^{N} b_j((1-i\sqrt{7})/2)^{N-j},$$

and i represents the square root of $-1$.

13. A device as in claim 1, wherein said $2^N$ Nth-order processing elements form a display screen, each of said Nth-order processing elements comprising an individual pixel.

14. A device as in claim 10, further comprising an output, and a substrate having a first surface in said plane and a second surface parallel to said plane, said identifying and ordering means including transfer members on said second surface, said $2^{N+P}$ processing elements being formed on said first surface with said transfer numbers coupling said $2^{N+P}$ processing subelements to said output, said storing means for each Nth-order processing element comprising means for storing a respective portion of the signal on the respective processing subelements thereof, the formula further defining the order of the signal portion from the respective processing subelements in the linear ordering, the sequence of bits $b_1, b_2, b_3, ....., b_{N+P}$ representing the relative position of the signal portions in the linear ordering, said identifying and ordering means further comprising means for transferring the signal portions stored on said processing subelements in a predetermined order.

15. A device as in claim 12, further comprising an output, and a substrate having a first surface in said plane and a second surface parallel to said first plane, said identifying and ordering means including transfer members on said second surface, said transfer members coupling said $2^{N+P}$ processing subelements to said output, said storing means for each Nth-order processing element comprising means for storing a respective portion of the signal on the respective processing subelements thereof, the formula further defining the order of the signal portions from the respective processing subelements in the linear ordering, the sequence of bits $b_1, b_2, b_3, ...., b_{N+P}$ representing the relative position of the signals in the linear ordering of the processing subelements, said identifying and ordering means further comprising means for transferring the signal portions stored on said processing subelements in a predetermined order.

16. A signal processing device as in claim 4, wherein said Nth order processing elements have a pseudo-fractal shape and wherein, defining a Cartesian x,y plane with said Nth-order processing elements arrayed thereon and the Nth-order processing elements thereby forming a two-dimensional array, the formula:

$$x + iy = \sum_{j=1}^{N} b_j(1 - i)^{N-j}$$

defines the positions of the Nth-order processing elements and the linear ordering of the signals therefrom wherein $b_j$ is the jth ordered bit of the sequence of bits $b_1, b_2, b_3, ... ..., b_N$; and i represents the square root of $-1$.

17. A signal processing device as in claim 4, wherein said Nth-order processing elements have a pseudo-fractal shape and wherein, defining a Cartesian x,y plane with said Nth-order processing elements arrayed thereon and the processing elements thereby forming a two-dimensional array, the formula:

$$x + iy = \sum_{j=1}^{N} b_j((1 - i\sqrt{7})/2)^{N-j}$$

defines the positions of the Nth-order processing elements and the linear ordering of the signals therefrom wherein $b_j$ is the jth ordered bit of the sequence of bits $b_1, b_2, b_3, ... ..., b_N$; and i represents the square root of $-1$.

18. A signal processing device as in claim 2, wherein said register means includes means for identifying the output signals from the respective Nth-order processing elements in which they were generated and linearly ordering the signals in such a manner that for each (N−k)th-order aggregate, each output signal generated by a processing element among the $2^k$ processing elements in a particular (N−k)th-order aggregate is contained in a same group of $2^k$ successively adjacent register output signals after the linear ordering.

19. A device as in claim 1, wherein each of said processing elements comprises at least one CCD.

20. A method of processing two-dimensional input signals, comprising the steps of:

forming a first-order transducer including $2^N$ Nth-order transducers formed in a continuous subprocessing element, N being a positive integer, said Nth-order transducers being adjacently arranged in a non-overlapping manner in a planar surface, the Nth-order transducers having substantially congruent shapes in said surface, each of the $2^N$ Nth-order transducers being aggregatable into one of $2^{N-k}$ (N−k)th-order non-overlapping aggregates of $2^k$ successively adjacent Nth-order transducers, for all values of k, where $0 < k \leq N$; each of the (N−k)th-order aggregates consisting of two adjacent (N−k+1)th-order aggregates for each value of k, the Nth-order transducers of each (N−k)th-order aggregate together covering a continuous surface area of said surface and defining an (N−k)th-order transducer, being congruent to every other (N−k)th-order transducer for the same value of k, and having a shape which is substantially geometrically similar to the shape of each (N−k)th-order processing element for all other values of k; each Nth-order transducer having means for receiving energy substantially evenly thereover in said planar surface;

receiving a two-dimensional signal on the Nth-order transducers in said planar surface;

storing the two-dimensional signal in the respective Nth-order processing elements as respective Nth-order signals;

linearly ordering the Nth-order signals such that the Nth-order signals stored in each (N−k)th-order aggregate of $2^k$ transducers for each positive integer value of k up to and including N, is contained in a same group of $2^K$ successively adjacent ones of Nth-order signals after the linear ordering;

outputting the Nth-order signals from the first-order transducer; and performing a mathematical one-dimensional transform of the linearly ordered Nth-order signals.

21. A method as in claim 20, wherein said step of performing a mathematical one-dimensional transform comprises the step of performing a one-dimensional Haar transform of the linearly ordered Nth-order signals.

* * * * *